Nov. 6, 1934.  W. D. BROWN  1,979,729
PRODUCTION OF SPONGE IRON
Filed June 5, 1933
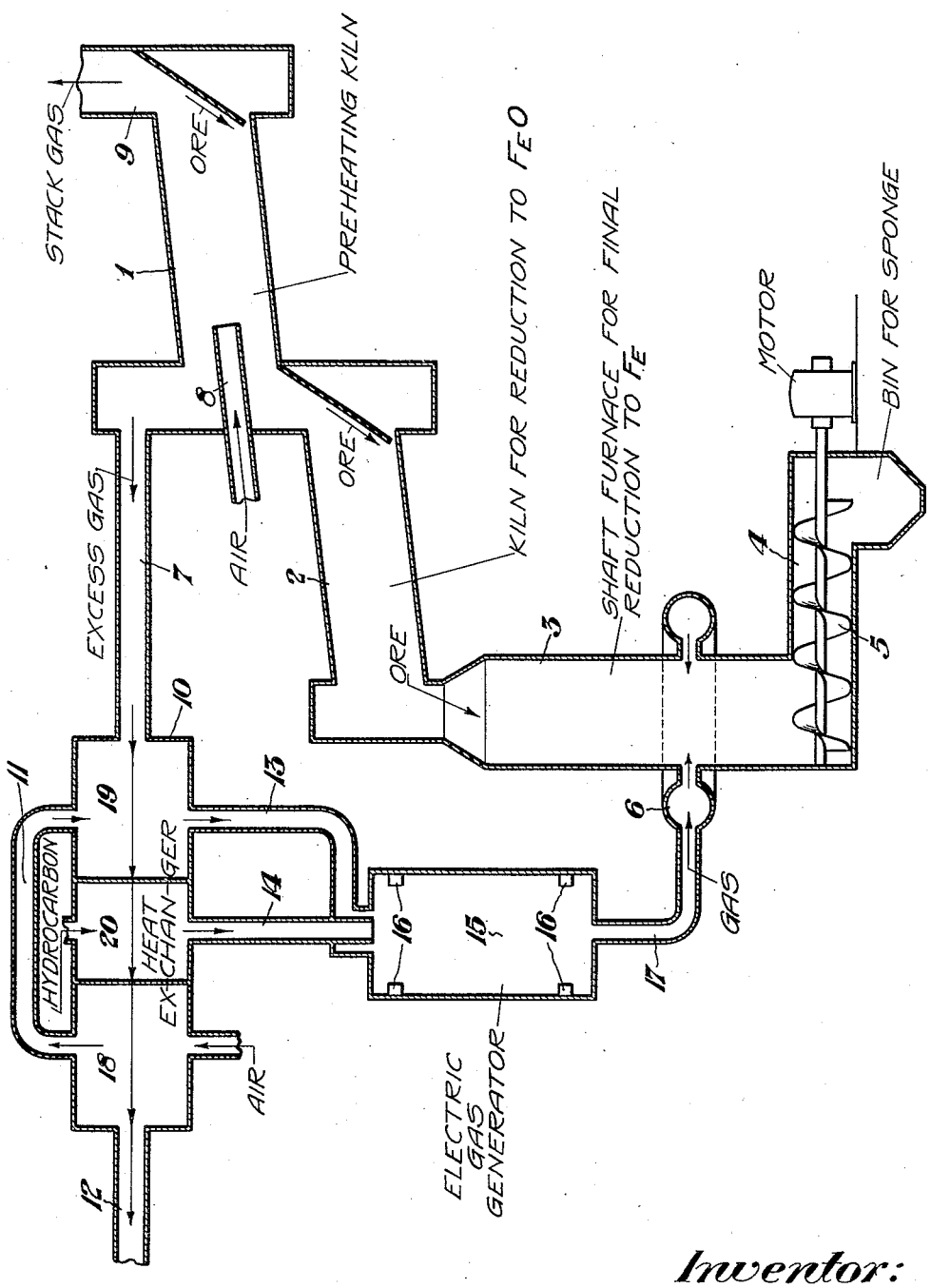
Inventor:
WILLIAM D. BROWN,
by: Usina & Rauber
his Attorneys.

Patented Nov. 6, 1934

1,979,729

UNITED STATES PATENT OFFICE 1,979,729

PRODUCTION OF SPONGE IRON

William D. Brown, Pittsburgh, Pa.

Application June 5, 1933, Serial No. 674,430

3 Claims. (Cl. 75—14)

REISSUED

If it is attempted to reduce iron oxide by hydrocarbons, I have found that deposition of carbon occurs and the resultant product is very much contaminated with carbon. The present invention utilizes hydrocarbons in the reduction of iron ores and similar iron-bearing materials without such contamination, producing iron in the form of a spongy or granular product.

For this purpose the hydrocarbons are first converted to a reducing gas consisting of a mixture of hydrogen and carbon monoxide. The conversion is accomplished by passing the hydrocarbon, such as natural gas, with a certain quantity of air through a catalytic chamber. This chamber is filled with particles of firebrick, coke or graphite or a mixture of one or more, some of which have been dipped in a solution of nickel nitrate, dried and ignited. I have found that the quantity of air should be such that the oxygen contained therein is just sufficient to combine with the carbon of the hydrocarbon to form carbon monoxide, liberating the hydrogen.

The reaction of conversion of hydrocarbons with air to carbon monoxide and hydrogen is exothermic, but some hydrocarbons, such as natural gas do not produce sufficient heat to raise the gas to the high temperature desired (2000° F.); consequently it is necessary to supply heat to the reaction. This heat may be supplied in various ways; as, for example, by passing an electric current through the catalyzer, or heat may be transferred through oven walls, or heat may be supplied by using intermittently two or more stoves in the usual manner.

By the term hydrocarbon is meant compounds of carbon and hydrogen. In this process I describe the use of natural gas, which is a mixture of methane, ethane, and higher members of the series such as propane. I do not desire to limit the invention to the use of natural gas, any volatile hydrocarbon such as mineral oil or benzol may be used. In the case of the hydrocarbons containing a high percentage of carbon it may not be necessary to heat the generator. I have also found that coke oven gas containing a mixture of hydrogen, carbon oxides and hydrocarbons can be used in place of natural gas.

I have also found that the mixture of carbon monoxide, hydrogen and nitrogen from the air, containing possibly traces of carbon dioxide, water and methane reduces oxides of iron, the product containing above 90 per cent of the iron in the metallic state with but little carbon deposited.

I have also found that dense magnetite ($Fe_3O_4$) when roasted in the presence of oxygen, changes into a porous form of oxide of iron ($Fe_2O_3$) which is easily reduced by the above reducing gases.

I have found that, while the particles of this oxide of iron ($Fe_2O_3$) tend to adhere together and also that the FeO resulting from partial reduction tends to adhere, when FeO is reduced by the above gases to metallic iron the particles at 1650° F. do not adhere but fall freely.

A particular process embodying the invention is the following: A mixture of air and natural gas is passed through a chamber containing a catalyzer, consisting of pieces of coke or graphite which have been dipped in a solution of nickel nitrate, dried and ignited. A current of electricity is passed through the chamber, thus supplying the heat required. Both the air and the natural gas have been heated (to 1500°–1000° respectively), by passing counter-current with the waste gas from reduction through heat exchangers. On account of the preheat, the heat required to be supplied by electricity is not excessive.

The reduction gas so produced at 2000° F. is conveyed to the reducing chamber. While I do not desire to limit the form or design of the reducing chamber or chambers, I describe the following as a practicable arrangement. Reduction is accomplished in two chambers. The large part of the reduction is accomplished in a kiln and the final reduction is accomplished in a shaft. The partially reduced material from the kiln empties into the shaft. The reducing gas enters near the bottom of the shaft and extends upwards, reducing all but trace of any iron oxide remaining. The gases then pass into the kiln where the main part of the reduction occurs. The gas first reduces the bulk of the FeO to Fe and then passing on reduces the $Fe_2O_3$ to FeO.

The gases which entered the reducing chamber at 2000° F. have become somewhat cooler, due to the endothermic nature of the reaction and to radiation loss, but not sufficiently so to stop the reaction. At the temperature which prevails when FeO is reduced to Fe, I have found that approximately 30 per cent of the original carbon monoxide and hydrogen have been used. As the gas proceeds, more of it is used in reducing $Fe_2O_3$ to FeO.

The gases left contain considerable carbon monoxide and hydrogen. Some of the gas (about 80 per cent) is bled for other uses as described, and the remaining gas is passed into the preheating kiln. It is necessary to have the incoming ore ($Fe_2O_3$) at about 1830°, consequently air is added to the gas in the preheater, thus raising the temperature to the necessary point. At the same time, dense crystals of magnetite ($Fe_3O_4$), if present, are broken up and porous $Fe_2O_3$ is formed. This latter oxide is much more reducible than the hard dense magnetite. The gas which is bled, containing as it does both sensible heat (temperature 1600° F.) and heat of combustion, may be used for other purposes, but half of it, or 40 per cent of the entire gas after reduction, may be used to heat the generator unless the generator is heated electrically.

In the process here described, the waste gases pass through a heat exchanger, counter-current to air. This air is later used in the generator. This heat exchanger is so constructed that the cold air passes through the cold part of the exchanger then passes around the middle part and then through the hottest part, while the hydrocarbon gas passes through the middle part.

By this means the hydrocarbon gas is heated up to a point below which methane or other hydrocarbons will deposit carbon, and the air is heated up nearly to the temperature of the waste gas entering the exchanger. The waste gases leaving the exchanger are available for combustion purposes either as they are or after further cooling and cleaning as desired.

The reduced granules from the bottom of the reduction shaft are removed by a water cooled screw conveyer through a pipe cooled externally. By this means they are cooled to atmospheric temperature. The reduced granules from the shaft may be conveyed while still hot into an electric furnace where they will be melted into a product containing but little carbon.

While I have described the use of air in the generator to convert hydrocarbons to carbon monoxide and hydrogen, it is apparent that commercial oxygen, steam or carbon dioxide may be used as substitutes for air. Also, some of the waste gases may be returned and the carbon dioxide and water contained therein be used in the conversion. The amount of heat required in the case of all of these, except oxygen, is greatly in excess of that required in the proposed process.

The accompanying drawing is a diagrammatic illustration of a suitable arrangement of apparatus.

The ore passes first through an inclined rotating preheating kiln 1, thence through a similar reducing kiln 2, thence through a shaft 3 in which the final reduction is effected. The kilns and shaft form a substantially airtight circuit. The product is taken off through a tube 4 by a screw conveyer 5.

The reducing gas enters the lower part of the shaft by tuyères from a bustle pipe 6. After passing through the shaft and reducing kiln a portion of the hot gas is taken off through a conduit 7. The remainder passes through the preheating kiln where it is mixed with air introduced through a pipe 8 to raise its temperature, passing out finally through the stack 9. The hot gases from the conduit 7 pass in succession through heat exchanger 10 to the discharge pipe 12.

The air passes through the cold part 18 of the exchanger 10, through the by-pass 11, then through the hot part 19 and by the pipe 13 and the hydrocarbon passes through the middle part 20 of the exchanger and by the pipe 14 to the chamber 15, in which is generated the reducing gas. Where additional heat is required in the generator, this is supplied through electrodes 16. The reducing gas passes through the pipe 17 to the bustle pipe for the shaft.

Instead of heating the catalyzer by an electric current, it may be contained in a muffle or oven or a series of the same and the heat applied externally by passing a flame or heating gases through flues surrounding the muffles or ovens. Or the catalyzer may be contained in two or more "stoves", which are alternately heated by the passage of heating gases and utilized for the passage and heating of the mixture of hydrocarbon and air.

I claim:

1. The method of reducing iron ore or the like which consists in passing the ore through a kiln and then into and through a shaft, generating a gas comprising hydrocarbon and carbon monoxide by passing a hydrocarbon and air through a catalyzer and heating the same to a temperature above about 1500 degrees Fahrenheit, heat being supplied by the passage of a current of electricity through the catalyzer, and passing said gas first through the charge in the shaft to accomplish the final reduction and thence through the kiln to accomplish a preliminary reduction.

2. The method of reducing iron ore or the like which consists in passing the ore through a kiln and then into and through a shaft, generating a gas comprising hydrocarbon and carbon monoxide by passing a hydrocarbon and air through a catalyzer and heating the same to a temperature above about 1500 degrees Fahrenheit, heat being supplied externally, and passing said gas first through the charge in the shaft to accomplish the final reduction and thence through the kiln to accomplish a preliminary reduction.

3. The process of claim 2, using coke-oven gas as the hydrocarbon.

WILLIAM D. BROWN.